United States Patent [19]
Werner

[11] 4,015,222
[45] Mar. 29, 1977

[54] MODULATED PASSBAND SIGNAL GENERATOR

[75] Inventor: Jean-Jacques Werner, Fair Haven, N.J.

[73] Assignee: Bell Telephone Laboratories, Incorporated, Murray Hill, N.J.

[22] Filed: Dec. 1, 1975

[21] Appl. No.: 636,563

[52] U.S. Cl. .............................. 332/9 R; 178/66 A; 325/141; 325/161; 325/164; 332/16 R; 332/21; 332/22; 332/23 R
[51] Int. Cl.[2] .......................................... H03C 3/00
[58] Field of Search ............ 332/9 R, 16 R, 21, 22, 332/23 R; 325/141–143, 145, 161, 163, 164; 178/66 A

[56] References Cited
UNITED STATES PATENTS 3,671,670  6/1972  Saltzberg ...................... 332/9 R X

OTHER PUBLICATIONS

Choquet et al., "Microcoded Modem Transmitters," IBM Journal of Research and Development, July, 1974, pp. 338–351.
Kalet et al., "In–Band Generation of Synchronous Linear Data Signals" IEEE Transactions on Communications, vol. COM-21, Oct. 1973, pp. 1116–1122.

Primary Examiner—Siegfried H. Grimm
Attorney, Agent, or Firm—Robert O. Nimtz; J. S.Cubert

[57] ABSTRACT

Disclosed is apparatus for generating carrier signals modulated by baseband symbol signals. The disclosed apparatus includes samplers for sampling input symbol signals, multipliers for multiplying the sampled signals by a precessing phase that is a function of the carrier signal's frequency, and modified filters for convolving the multiplied signals with a complex (real and imaginary) low pass impulse response and for selecting the real part of the convolved signals.

22 Claims, 5 Drawing Figures

MODULATED PASSBAND SIGNAL GENERATOR

BACKGROUND OF THE INVENTION

This invention relates to data communication apparatus and, more particularly, to apparatus for digitally generating bandpass signals.

Data transmission over voice frequency channels is generally accomplished by modulating a baseband data signal onto a carrier signal, developing thereby a bandpass signal, and then transmitting the modulated signal to a distant receiver wherein the signal is demodulated. The transmitter's modulation process generally includes low pass filtering to insure that the baseband signal is of a finite known bandwidth, modulating onto a carrier by means of any of a variety of modulation schemes, and bandpass filtering to insure that the transmitted signal occupies a finite known frequency band.

With the present trend of semiconductor technology toward large scale integration, a number of attempts have been made to implement the transmitter functions by digital techniques in a fashion that lends itself to integration. In an article entitled "In-Band Generation of Synchronous Linear Data Signals," *IEEE Trans. on Comm.*, Vol. COM 21 No. 10, Oct. 1973, page 1116, Kalet and Weinstein describe a bandpass signal generator employing a finite number of fixed filters which, in combination, develop bandpass signals. In an article entitled, "Microcoded Modem Transmitters," *IBM J. Res. Develop.*, July 1974, pp. 338–351, Choquet et al described a transmitter design employing a digital finite impulse response filter and programmable, cyclically modified, filter coefficients to obtain the desired bandpass signal. Both the Kalet and the Choquet apparatus are useful only when the ratio of the desired carrier frequency to the filters' processing rate is a rational number.

SUMMARY OF THE INVENTION

It is an object of this invention to provide a bandpass signal generator which is not limited to rational number ratios of carrier frequencies to a filter's processing rate.

This and other objects are achieved by multiplying a sampled applied input signal by a particularly defined precessing phasor signal and by convolving the product with a fixed low pass filter. More particularly, incoming symbol signals, which may comprise real and imaginary components, are sampled at a preselected rate. The sampled signals are multiplied by a time precessing phasor of unit magnitude, and the complex product signals are applied to a complex low pass filter. The low pass filter convolves the applied complex product signals with a particularly defined fixed impulse response and develops the real part of the convolved signals as the desired bandpass signal.

DETAILED DESCRIPTION

Figure 1:
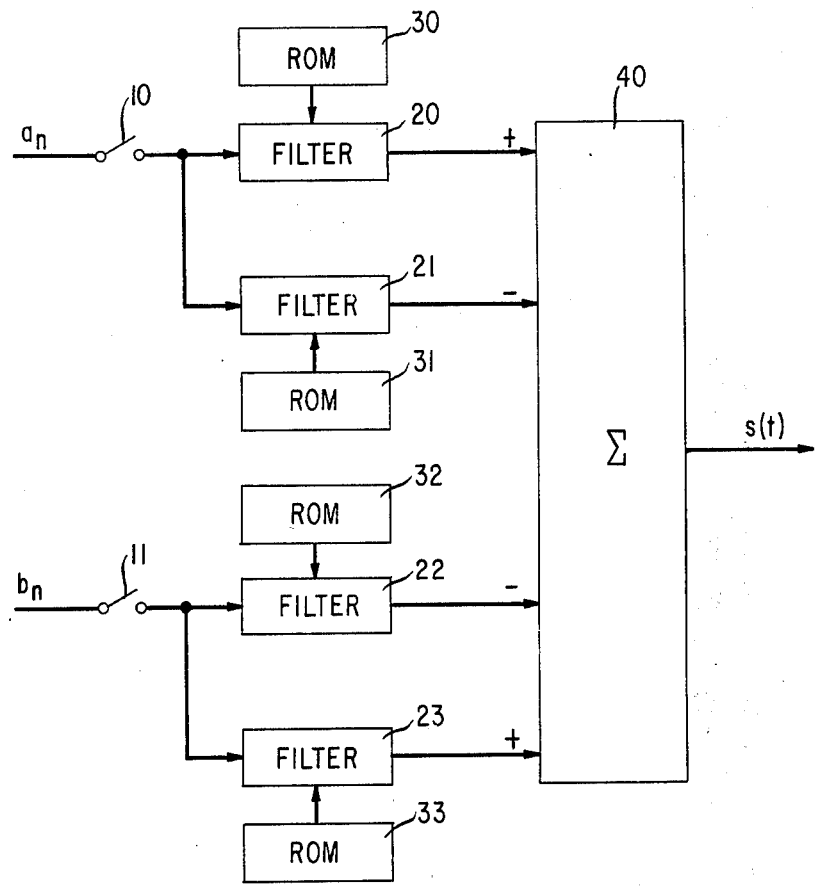
FIG. 1 depicts a schematic block diagram of a prior art bandpass signal generator.

In general, a bandpass signal generated by a data communication transmitter can be represented by $$s(t) = [\sum_n (a_n g(t-nT) - b_n h(t-nT))] \cos \omega_c t$$
$$- [\sum_n (a_n h(t-nT) + b_n g(t-nT))] \sin \omega_c t \quad (1)$$

where $a_n$ and $b_n$ are the symbols to be transmitted, $h(t)$ and $g(t)$ are Nyquist pulses, $T$ is a symbol period and $\omega_c$ is the carrier's radian frequency. A Nyquist pulse $g(t)$ is an analog signal having the property $g(t-nT) = 0$ for $t = mT$ when $m \neq n$, and $g(0) = 1$.

A more compact representation of equation (1) is obtained by using complex signals. Thus, equation (1) can be represented by $$s(t) = Re[z(t)] = Re[\sum_n C_n R(t-nT) e^{j\omega_c t}] \quad (2)$$

where $$C_n = a_n + j b_n \quad (3)$$

and $$R(t-nT) = g(t-nT) + j h(t-nT). \quad (4)$$

In accordance with prior art teachings, the $z(t)$ expression of equation (2) can be rewritten as $$z(t) = \sum_n C_n \delta(t-nT) * e^{j\omega_c nT} R(t) e^{j\omega_c t}, \quad (5)$$

where $\delta(t-nT)$ is the standard delta function ($\delta(t)=0$ for all $t \neq 0$ and $\int \delta(t)dt$ about 0 is 1), and where the symbol "*" designates convolution. A perusal of equation (5) indicates that signal $z(t)$ can be computed by sampling the $C_n$ signals, by convolving the sampled signals in a filter whose impulse response is $e^{j\omega_c nT} R(t) e^{j\omega_c t}$, and by summing the filter's output signals for all values of $n$. This is basically the approach taken by Kalet and Choquet as described in the aforementioned articles. From equation (2) it may be seen that the desired bandpass signal is obtained by evaluating the real part of $z(t)$. Accordingly, substituting equations (3) and (4) into equation (5) and taking the real part thereof yields $$s(t) = Re[z(t)] = \sum_n a_n \delta(t-nT) * g(t)\cos \omega_c(nT+t)$$
$$- \sum_n b_n \delta(t-nT) * h(t)\cos \omega_c(nT+t)$$
$$- \sum_n a_n \delta(t-nT) * h(t)\sin \omega_c(nT+t)$$
$$+ \sum_n b_n \delta(t-nT) * g(t)\sin \omega_c(nT+t). \quad (6)$$

Equation (6) indicates that the bandpass signal $s(t)$ may be implemented by combining the output signals of four circuits. In each one of the circuits, a predetermined symbol signal ($a_n$ or $b_n$) is sampled and is applied to a filter having a predetermined impulse response (e.g., $g(t)\cos \omega_c(nT+t)$). It would be noted that all of the filters specified by equation (6) have an impulse response which is different for different values of $n$. Therefore, as $n$ changes with time, so must the impulse response of the filters. It can be said, therefore, that implementation of the signal $s(t)$ in accordance with the teachings of equation (6) requires the use of time varying filters.

If $\omega_c/2\pi$ and T are not related by a rational number, the impulse responses required by equation (6) change in a noncyclical manner. Under such circumstances, the impulse response of the filters must be computed anew for each $n=0,1,2, \ldots \infty$. Such computations require a substantial amount of hardware. If, on the other hand, $\omega_c/2\pi$ and T are related by a rational number, then the necessary impulses responses repeat cyclically, permitting the use of impulse responses which are modified by the contents of a read-only-memory.

The cyclical repetition of the required impulse responses is the reason behind the "rational number" requirement of the Kalet and Choquet apparatus mentioned above.

In order to more fully appreciate the improvements comprising this invention, FIG. 1 is presented to illustrate an implementation of a prior art bandpass signal generator characterized by equation (6) and having $\omega_c/2\pi$ related to T by a rational number. The symbol signals $a_n$ and $b_n$ are applied, in FIG. 1, to samplers 10 and 11, respectively, which may simply comprise controllable analog gates. The output signal of sampler 10 is applied to filters 20 and 21, and the output signal of sampler 11 is applied to filters 22 and 23. Associated with filters 20 and 21 are read-only-memory (ROM) units 30 and 31, respectively. Filter 20 in combination with ROM unit 30 is arranged to possess an impulse response $g(t)\cos \omega_c(nT+t)$, which is variable with respect to $n$ under control of ROM unit 30. Filter 21 in combination with ROM unit 31 is arranged to possess an impulse response $h(t)\cos \omega_c(nT+t)$, which, as in the filter 20-ROM 30 interconnection, is variable with respect to $n$ and is under control of ROM unit 31. Associated with filters 22 and 23 are ROM units 32 and 33, respectively. As in the filter 20-ROM 30 interconnection, each of filters 22 and 23 with its associated ROM unit possesses an impulse response which is variable with $n$ and which is controlled as to this variability by the associated ROM unit. In accordance with equation (6), filter 22 is arranged to possess an impulse response characterized by $h(t)\sin \omega_c(nT+t)$, and filter 23 is arranged to possess an impulse response characterized by $g(t)\sin \omega_c(nT+t)$.

Element 40 of FIG. 1 develops the bandpass signal $s(t)$ by arithmetically combining the output signals of filters 20, 21, 22 and 23. More specifically, signal $s(t)$ is developed by summing the output signals of filters 20 and 22 with the negative of the output signals of filters 21 and 22. Element 40 may be an adder/subtractor circuit implemented in accordance with the teachings of I. Flores, *The Logic of Computer Arithmetic*, Prentice-Hall Inc., 1963, Chapter 4.

As illustrated, the bandpass signal generator implementation of FIG. 1 requires extensive use of read-only-memories. Additionally, the FIG. 1 circuit requires the carrier frequency $\omega_c/2\pi$ to be related to the symbol period T by a rational number.

These disadvantages have been eliminated in view of the discovery that the $z(t)$ expression of equation (2) may be rewritten as $$z(t) = \sum_n e^{j\omega_c nT} C_n \delta(t - nT) * R(t) e^{j\omega_c t}. \tag{7}$$

A perusal of equation (7) reveals that terms which vary with respect to $n$ appear only on the left side of the convolution equation—which defines the applied signal—and not on the right side of the convolution equation—which defines the impulse response of the filter. Therefore, no time varying filters are necessary for developing the $z(t)$ signal of equation (7). However, since the left hand side of equation (7) now has the $e^{j\omega_c nT}$ term, a time variation requirement is introduced on the sampled $C_n$ signals (which are, of course, time varying).

On first blush, it appears that the time variation requirement by the $e^{j\omega_c nT}$ signal of equation (7) is identical to the filters' time variation requirement of equations (5) and (6) and that, therefore, no savings are realized. Upon a closer look, however, it can be seen that it is considerably easier to accurately multiply the $C_n$ values by arbitrary phasors than it is to multiply whose sets of filter coefficients. First, there are fewer values to multiply ($C_n$ signals generally take on only a small set of values), and second, for many applications, the relevant $C_n$ signals lie on a unit circle. With such $C_n$ signals (as will be shown below), multiplication by the phasor $e^{j\omega_c nT}$ takes the form of the simple addition of phase angles.

Figure 2:
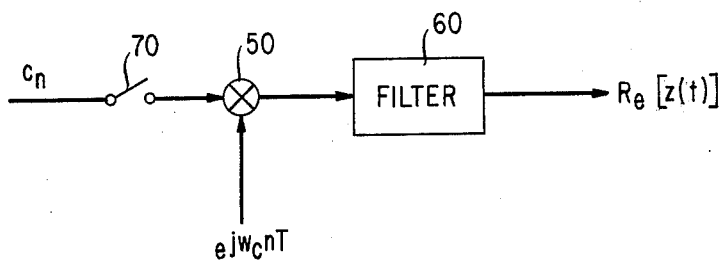
FIG. 2 illustrates a general block diagram of the signal generator in accordance with the principles of this invention.

FIG. 2 is a block diagram of a circuit which in, accordance with the principles of this invention, is capable of developing the complex bandpass signal $z(t)$ as defined by equation (7). In FIG. 2, the comlex symbol signals $C_n$ are sampled in sampler 70 and are multiplied in complex multiplier 50 by the time precessing phasor $e^{j\omega_c nT}$ which is increasing in phase with increasing $n$. If $C_n$ is available in polar coordinates, multiplier 50 may be implemented with an adder which adds the phase angle of each $C_n$ signal to the phase angle $\omega_c nT$. If $C_n$ is available in cartesian coordinates, multiplier 50 may be implemented with a circuit for converting the applied cartesian coordinate $C_n$ signals to polar coordinate $C_n$ signals. Alternatively, multiplier 50 may comprise a plurality of multipliers for calculating the desired produce signals directly in cartesian coordinates. One embodiment of such a multiplier is described below in reference to FIG. 3.

The multiplied output signals of multiplier 50 of FIG. 2 are applied to filter 60. In accordance with equation (7), filter 60 possesses an impulse response characterized by $R(t) e^{j\omega_c t}$, where $R(t)$ is as defined by equation (4). Filter 60 may, generally, be a recursive or a nonrecursive filter. Its specific embodiment, however, is dependent on the characteristics of the incoming signal (polar or cartesian) and on the user's preference. When the $C_n e^{j\omega_c nT}$ signal is available in cartesian coordinates, it is generally found easier to perform the filtering process entirely in cartesian coordinates — particularly since only the real part of the signal $z(t)$ is desired as indicated by equation (2).

To characterize the hardware implementation of equation (7) in cartesian coordinates, it is necessary to substitute equations (3) and (4) into equation (7) and take the real part thereof, yielding $$s(t) = Re[z(t)] = \sum_n (a_n\cos \omega_c nT - b_n\sin \omega_c nT)\delta(t - nT) * g(t)\cos \omega_c t$$

$$- \sum_n (a_n\cos \omega_c nT - b_n\sin \omega_c nT)\delta(t - nT) * h(t)\sin \omega_c t$$

$$- \sum_n (b_n\cos \omega_c nT + a_n\sin \omega_c nT)\delta(t - nT) * h(t)\cos \omega_c t$$

$$- \sum_n b_n\cos \omega_c nT - a_n\sin \omega_c nT)\delta(t - nT) * g(t)\sin \omega_c t. \quad (8)$$

Equation (8) is similar in format to equation (6) in that both indicate the use of four filters. However, unlike the filters of equation (6), the impulse responses of the filters of equation (8) are not dependent on the variable $n$, and are therefore time invariant.

Figure 3:
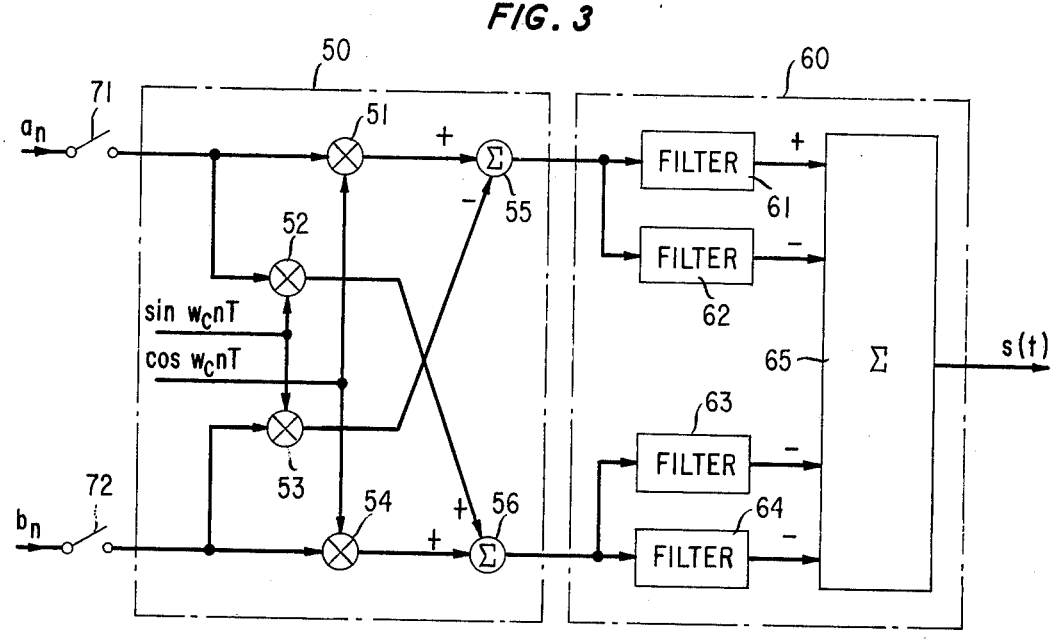
FIG. 3 is a block diagram of the generator illustrated in FIG. 2 suitable for signals available in cartesian coordinates.

FIG. 3 depicts a block diagram schematic for the cartesian coordinate implementation of the FIG. 2 circuit in accordance with equation (8).

In FIG. 3, signals $a_n$ and $b_n$ are sampled at a rate of 1/T by sampling circuits 71 and 72, respectively. Like samplers 10 and 11 of FIG. 1, samplers 71 and 72 may comprise controllable analog gates. The sampled $a_n$ and $b_n$ symbol signals are applied, as in FIG. 2, to multiplier 50 wherein the sampled symbol signals are multiplied by the variable phasor $e^{j\omega_c nT}$. Within multiplier 50, multiplier unit 51 multiplies the sampled $a_n$ signal by an applied cosine signal, $\cos \omega_c nT$, and multiplier unit 52 multiplies the sampled $a_n$ signal by an applied sine signal, $\sin \omega_c nT$. Similarly with respect to the $b_n$ signal, multiplier unit 53 multiplies the sampled $b_n$ signal by the applied sine signal, $\sin \omega_c nT$, and multiplier unit 54 multiplies the sampled $b_n$ signal by the applied cosine signal, $\cos \omega_c nT$. In subtractor 55, the output signal of multiplier unit 53 is subtracted from the output signal of multiplier unit 51 to develop the signal $(a_n \cos \omega_c nT - b_n \sin \omega_c nT)\delta(t-nT)$. In adder 56, the output signal of multiplier unit 52 is added to the output signal of multiplier unit 54 to develop the signal $(b_n\cos \omega_c nT + a_n\sin \omega_c nT)\delta(t-nT)$. The output signals of subtractor 55 and adder 56 are applied to filter block 60.

Within filter 60, the output signal from subtractor 55 is applied to filters 61 and 62 which respectively convolve their input signals with impulse responses $g(t)\cos \omega_c t$ and $h(t)\sin \omega_c t$. Similarly, the output signal from adder 56 is applied to filters 63 and 64 which respectively convolve their input signals with impulse responses $h(t)\cos \omega_c t$ and $g(t)\sin \omega_c t$. Also within filter 60, the output signals of filters 62, 63 and 64 are subtracted from the output signal of filter 61 in summing network 65, providing thereby an output signal for filter 60 which is equal to the desired signal $s(t)$ of equation (8). Summing network 65 may be implemented in a manner similar to the implementation of network 40 of FIG. 1.

Filters 61–64 may be of any construction. They may be recursive filters or nonrecursive (transversal) filters. In some situations, however, transversal filters are preferable because of their linear phase characteristics and because of their ease of implementation. For example, a transversal filter may simply comprise a shift register with signal taps at every stage of delay, means for multiplying the output signal of each tap by a filter coefficient, and means for adding the multiplied signals. Another advantage of non-recursive filters relates to the case of specifying a selected impulse response. As is well known, a transversal filter may be made to possess a selected impulse response simply by specifying the tap signal multiplication coefficients to be the sampled values of the desired impulse response.

Of course, the sampled values of the desired impulse response are not obtained by sampling the impulse response at the symbol rate of sampling signals $a_n$ and $b_n$ (which is at the rate of 1/T seconds). Rather, the impulse response is sampled at a rate that relates to the digital realization of the bandpass signal $s(t)$ in the digital transversal filters. In accordance with well-known sampling theorems, since the signal $s(t)$ is centered about a carrier $\omega_c$, the filter realization must proceed at a sampling rate that is at least equal to $2(\omega_c+B)$ where B is half the bandwidth of $s(t)$. That is the sampling rate which is used to obtain the transversal filters coefficients.

Since the circuit of FIG. 3 implements the expression of equation (8), it can be appreciated that the FIG. 3 circuit is capable of generating signals having the form of equation (1). A number of specific modulation approaches, however, have characteristic forms which may be classified as subsets of equation (1). For example, the familiar expressions for Quadrature Amplitude Modulation (QAM) and Differential Phase Shift Keying modulation (DPSK) can be obtained by letting $h(t)=0$ in equation (1). Similarly, the expression for single Sideband modulation may be obtained by lettering $b_n=0$. From the above, it may be realized that for specific modulation approaches, the implementation of the FIG. 2 circuit is simpler than shown in FIG. 3. The following are some of the more unusual examples.

a. Phase Shift Keying (PSK)

A PSK signal can be written as $$s(t) = \sum_n g(t - nT) \cos (\omega_c t + \phi_n), \quad (9)$$

yielding a signal $z(t)$ equal to $$z(t) = \sum_n e^{j\phi_n}g(t - nT)e^{j\omega_c t} \quad (10)$$

where $e^{j\phi_n}$ defines the signal constellation $C_n$ (on the unit circle). In accordance with equation (7), the $z(t)$ signal of equation (10) may be rewritten, yielding $$z(t) = \sum_n e^{j(\phi_n+\omega_c nT)} \delta(t - nT) * g(t)e^{j\omega_c t}. \quad (11)$$

Interestingly, the phasor multiplication of element 50 degenerates to a simple addition of the angles $\phi_n$ and $\omega_c nT$.

Figure 4:
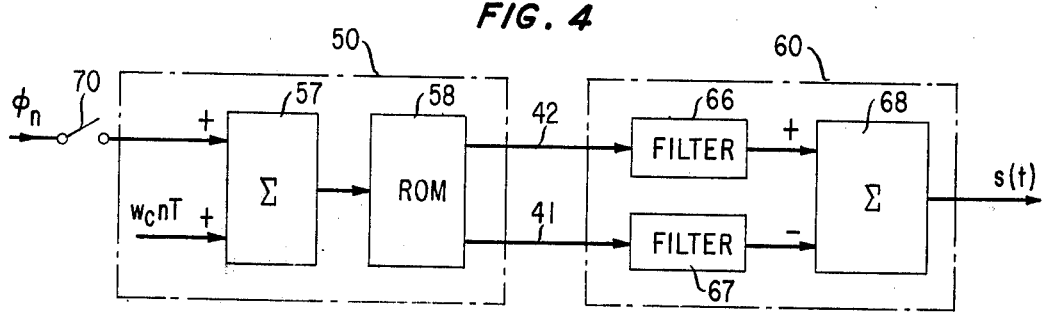
FIG. 4 depicts the generator illustrated in FIG. 2 suitable for generating Phase Shift Keying modulated signals.

FIG. 4 is a block diagram of a PSK modulator characterized by equation (11). Contained in multiplication block 50 of FIG. 4 is an adder 57 and a read-only-memory (ROM) 58. Adder 57 sums the symbol signal $\phi_n$ (sampled by sampler 70) with the precessing angle $\omega_c nT$, and ROM 58, in response to adder 57, develops the sine and cosine values of the summed angle ($\phi_n + \omega_c nT$) on output leads 41 and 42, respectively.

Since adder 57 sums angles, it must perform the summation in modulo $2\pi$. If ROM 58 contains the sine and cosine tables from 0 to $2\pi$ in $2^k$ memory locations, then adder 57 has to operate in modulo $2^k$. This, of course, is not a difficult requirement on adder 57 since all binary adders naturally do add in modulo $2^k$, where $k$ is the number of addition stages. Therefore, adder 57 may simply be a binary adder having $k$ addition stages, and ROM 58 may be a memory having $2^k$ addresses — storing in these addresses the values of the sine and cosine functions over the range of 0–$2\pi$. To those skilled in the art, it will be apparent that in employing a small amount of logic circuitry, various trigonometric relationships of the sine and cosine function may be utilized to reduce the size of ROM 58.

Within filter block 60 of FIG. 4, filter 66 convolves the cosine signal on lead 42 with an impulse response $g(t)\cos \omega_c t$, and filter 67 convolves the sine signal on lead 41 with an impulse response $g(t) \sin \omega_c t$. The output signal of filter 67 is subtracted from the output signal of filter 66 in unit 68, developing thereby an output signal of filter 60. It can be shown that the output signal of unit 68 is equal to the real part of the $z(t)$ of equation (11), which is the desired $s(t)$ signal.

b. DPSK Modulation

Figure 5:
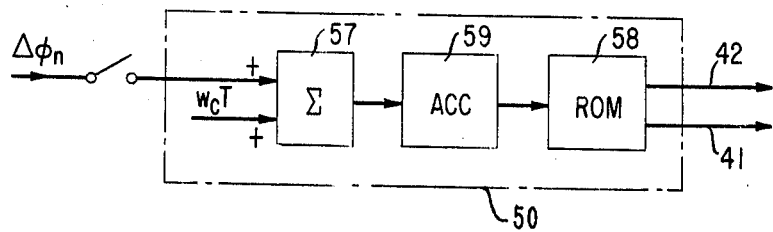
FIG. 5 is a block diagram of a particular embodiment of element 50 of FIG. 2 which is suitable for implementations which generate Differential Phase Shift Keying modulated signals.

In DPSK Modulation, the transmitted signal has the form of equation (9) but the transmitted symbol is contained in a differential angle $\Delta\phi_n = \phi_n = \phi_{n-1}$. To obtain the ($\phi_n + \omega_c nT$) signal required at the input terminal of ROM 58 of FIG. 4, it is only necessary to replace the precessing $\omega_c nT$ signal applied to adder 57 with a fixed $\omega_c T$ signal, and to interpose an accumulator 59, as depicted in FIG. 5, between adder 57 and ROM 58. By applying the symbol signal $\Delta\phi_n$ to adder 57 together with the fixed $\omega_c T$ signal, the accumulated output signal developed by accumulator 59 is $$\sum_{i=-\infty}^{n} \Delta\phi_i + \omega_c T$$

which is equal to $\phi_n + \omega_c nT$ as required by equation (9).

Interestingly, adder 57 may be simplified for special values of $\omega_c nT$. In the extreme, if $\omega_c T$ is equal to $2\pi$, adder 57 may be completely eliminated since it adds in modulo $2\pi$ and is, therefore, insensitive to input signals which equal to $2\pi$.

What is claimed is:

1. A bandpass signal generator comprising:
    means for sampling applied input signals at a preselected rate;
    means for multiplying the output signals of said means for sampling by a phasor whose angle is advanced by a preselected additive constant at each sampling interval of said means for sampling; and
    means for convolving the output signal of said means for multiplying with a preselected impulse response.

2. Apparatus responsive to symbol signals applied at a predetermined rate 1/T, for generating a carrier signal of preselected frequency $\omega_c$ modulated by said symbol signals comprising:
    means for sampling said symbol signals at said predetermined rate;
    means for multiplying the sampled signals by a phasor $e^{j\omega_c nT}$ where $n$ is an integer which is continually increasing with each sampled symbol signal; and
    means for convolving the output signal of said means for multiplying with a complex predetermined impulse response.

3. The apparatus of claim 2, wherein said means for convolving develops a real signal.

4. The apparatus of claim 2 wherein said means for convolving generates a convolution product of said output signal of said means for multiplying with a fixed impulse response and develops an output signal representative of the real part of said convolution product.

5. The apparatus of claim 4 wherein said fixed impulse response is of a class providing low pass filtering.

6. The apparatus of claim 4 wherein said impulse response is $[g(t) + j h(t)]e^{j\omega_c t}$ where $g(t)$ and $h(t)$ are Nyguist pulses.

7. The apparatus of claim 2 wherein said symbol signals contain real components $a_n$ and imaginary components $b_n$.

8. Apparatus for generating a modulated carrier signal $s(t)$ of the form $$s(t) = [\sum_n (a_n g(t - nT) - b_n h(t - nT))] \cos \omega_c t$$
$$- [\sum_n (a_n h(t - nT) + b_n g(t - nT))] \sin \omega_c t$$

where $\omega_c$ is the radian carrier frequency of said carrier signal, $a_n$ and $b_n$ are symbol signals, $g(t)$ and $h(t)$ are Nyguist pulses, T is the symbol period, and $n$ is a variable integer incremented with each symbol period, comprising:
    first means for sampling said $a_n$ and $b_n$ symbol signals at a periodicity of T to develop sampled signals $a_n \delta(t-nT)$ and $b_n \delta(t-nT)$, respectively;
    second means for combining nonzero ones of said sampled symbol signals with a $\cos \omega_c nT$ signal and with a $\sin \omega_c nt$ signal to develop a first signal and a second signal;
    third means for convolving said first and second signals by a plurality of preselected impulse responses to develop a like plurality of filtered signals; and
    fourth means for arithmetically combining said plurality of filtered signals.

9. The apparatus of claim 8 wherein said second means comprises:
    means for multiplying each nonzero one of said sampled symbol signals by a $\cos \omega_c nT$ signal and a $\sin \omega_c nT$ signal, developing thereby product signals;
    means for arithmetically joining selected ones of said product signals to develop a said first signal representative of the signal $(a_n \cos \omega_c nT - b_n \sin \omega_c nT)\delta(t-nT)$ and said second signal representative of the signal $(a_n \sin \omega_c nT + b_n \cos \omega_c nT)\delta(t-nT)$.

10. The apparatus of claim 9 wherein said third means comprises:
    first and second filters for convolving said first signal by $g(t)\cos \omega_c t$ and $h(t)\sin \omega_c t$, respectively; and third and fourth filters for convolving said second signal by $g(t)\sin \omega_c t$ and $h(t)\cos \omega_c t$, respectively.

11. The apparatus of claim 10 wherein said means for arithmetically joining comprises:
means for subtracting the output signals of said second, third and fourth filters from the output signal of said first filter.

12. The apparatus of claim 9 wherein said $h(t)$ Nyguist pulse is equal to zero and wherein said third means comprises a first filter for convolving said first signal by $g(t)\cos \omega_c t$ and a second filter for convolving said second signal by $g(t)\sin \omega_c t$.

13. The apparatus of claim 9 wherein said $g(t)$ Nyguist pulse is equal to zero and wherein said third means comprises a first filter for convolving said first signal by $h(t)\sin \omega_c t$ and a second filter for convolving said second signal by $h(t)\cos \omega_c t$.

14. The apparatus of claim 9 wherein either one of said symbol signals is equal to zero, leaving one non-zero sampled symbol signal, and wherein said second means comprises:
fifth means for multiplying said nonzero sampled symbol signal by said $\cos \omega_c nT$ signal; and
sixth means for multiplying said nonzero sampled signal by said $\sin \omega_c nT$ signal.

15. The apparatus of claim 14 wherein said third means comprises:
first and second filters for convolving said first signal by $g(t)\cos \omega_c t$ and $h(t)\sin \omega_c t$, respectively, and
third and fourth filters for convolving said second signal by $g(t)\sin \omega_c t$ and $h(t)\cos \omega_c t$, respectively.

16. The apparatus of claim 14 wherein said means for arithmetically joining comprises:
means for subtracting the output signals of said second, third, and fourth filters from the output signal of said first filter.

17. The apparatus of claim 14 wherein said $h(t)$ Nyguist pulse is equal to zero and wherein said means for convolving comprises a first filter for convolving said first signal by $g(t)\cos \omega_c t$ and a second filter for convolving said second signal by $g(t)\sin \omega_c t$.

18. The apparatus of claim 14 wherein said $g(t)$ Nyguist pulse is equal to zero and wherein said means for convolving comprises a first filter for convolving said first signal by $h(t)\sin \omega_c t$ and a second filter for convolving said second signal by $h(t)\cos \omega_c t$.

19. Apparatus for developing modulated signals of the form $$s(t) = \sum_n g(t) \cos (\omega_c t + \phi_n)$$

where $\omega_c$ is a radian carrier frequency, $\phi_n$ is a phase angle signal related to an applied symbol signal, $g(t)$ is a Nyguist pulse, T is the symbol period, and $n$ is an integer variable continually incrementing with each symbol period, comprising:
means for developing a cosine signal and a sine signal of an angle representative of the sum of said $\phi_n$ signal and of a precessing angle $\omega_c nT$;
means for convolving said developed cosine and sine signals with preselected fixed impulse responses; and
means for arithmetically combining the output signals of said means for convolving.

20. The apparatus of claim 19 wherein said means for developing comprises:
means for sampling said $\phi_n$ signal;
addition means for adding said sampled $\phi_n$ signal with said precessing phase angle $\omega_c nT$; and
means responsive to said addition means for developing said sine and cosine signals.

21. The apparatus of claim 19 wherein said means for convolving comprises:
a first filter for convolving said cosine signal with $g(t)\cos \omega_c t$; and
a second filter for convolving said sine signal with $g(t)\sin \omega_c t$.

22. The apparatus of claim 19 wherein said means for developing comprises;
means for sampling applied symbol signals $\Delta\phi_n$, where $\Delta\phi_n$ is related to said phase angle signal $\phi_n$ by the relation $\phi_n = \phi_{n-1} + \Delta\phi_n$;
addition means for adding said sampled $\Delta\phi_n$ signals to a fixed phase angle $\omega_c T$;
means for accumulating the output signals of said addition means; and
means responsive to said means for accumulating for developing said sine and cosine signals.

* * * * *